(12) United States Patent
Chen (10) Patent No.: US 7,648,109 B2
(45) Date of Patent: Jan. 19, 2010

(54) SUCKER THAT IS REMOVED EASILY AND QUICKLY

(76) Inventor: Lung-Chih Chen, 108, Shengli $2^{nd}$ St., Tanzih Township, Taichung County (TW)

( * ) Notice: Subject to any disclaimer, the term of this patent is extended or adjusted under 35 U.S.C. 154(b) by 147 days.

(21) Appl. No.: 12/034,815

(22) Filed: Feb. 21, 2008

(65) Prior Publication Data

US 2008/0277544 A1 Nov. 13, 2008

(30) Foreign Application Priority Data

May 9, 2007 (DE) .................. 20 2007 006 607 U (51) Int. Cl.
*F16B 47/00* (2006.01)

(52) U.S. Cl. .............. 248/205.5; 248/205.7; 248/205.8; 248/206.1; 248/206.2; 248/683; 248/363; 248/309.3

(58) Field of Classification Search .............. 248/205.5, 248/205.6, 205.7, 205.8, 205.9, 205.1, 206.2, 248/206.1, 309.3, 363, 683
See application file for complete search history.

(56) References Cited

U.S. PATENT DOCUMENTS

| 6,234,435 | B1 * | 5/2001 | Yeh ......................... 248/205.5 |
| 6,308,923 | B1 * | 10/2001 | Howard ................... 248/205.5 |
| 6,550,735 | B1 * | 4/2003 | Zheng ........................ 248/304 |
| 6,749,160 | B1 * | 6/2004 | Richter .................... 248/206.2 |
| 7,007,908 | B2 * | 3/2006 | Tsay ....................... 248/309.3 |
| 7,066,434 | B2 * | 6/2006 | Kwok ...................... 248/205.8 |
| 7,293,750 | B2 * | 11/2007 | Richter .................... 248/205.5 |
| 2007/0246621 | A1 * | 10/2007 | Akai et al. ............... 248/205.5 |
| 2007/0262217 | A1 * | 11/2007 | Wang et al. .............. 248/205.5 |

* cited by examiner

*Primary Examiner*—J. Allen Shriver
*Assistant Examiner*—Todd M. Epps
(74) *Attorney, Agent, or Firm*—Alan Kamrath; Kamrath & Associates PA (57) ABSTRACT

A sucker includes a fixing seat, a sucker body, a control handle and a control valve. The sucker body has a first side provided with a recess and a second side provided with a connecting hole connected to the recess. The control valve includes a valve stem movably mounted on the fixing seat and movable to stop the recess. Thus, the valve stem can be pulled outwardly to detach from the recess of the sucker body so as to connect the connecting hole and the recess of the sucker body and to connect the connecting hole of the sucker body to the ambient air so as to break the vacuum state of the sucker body so that the sucker body can be removed from a surface easily and quickly.

14 Claims, 8 Drawing Sheets

SUCKER THAT IS REMOVED EASILY AND QUICKLY

BACKGROUND OF THE INVENTION

1. Field of the Invention

The present invention relates to a sucker and, more particularly, to a sucker that is attached onto a surface by a vacuum suction force.

2. Description of the Related Art

Figure 6:
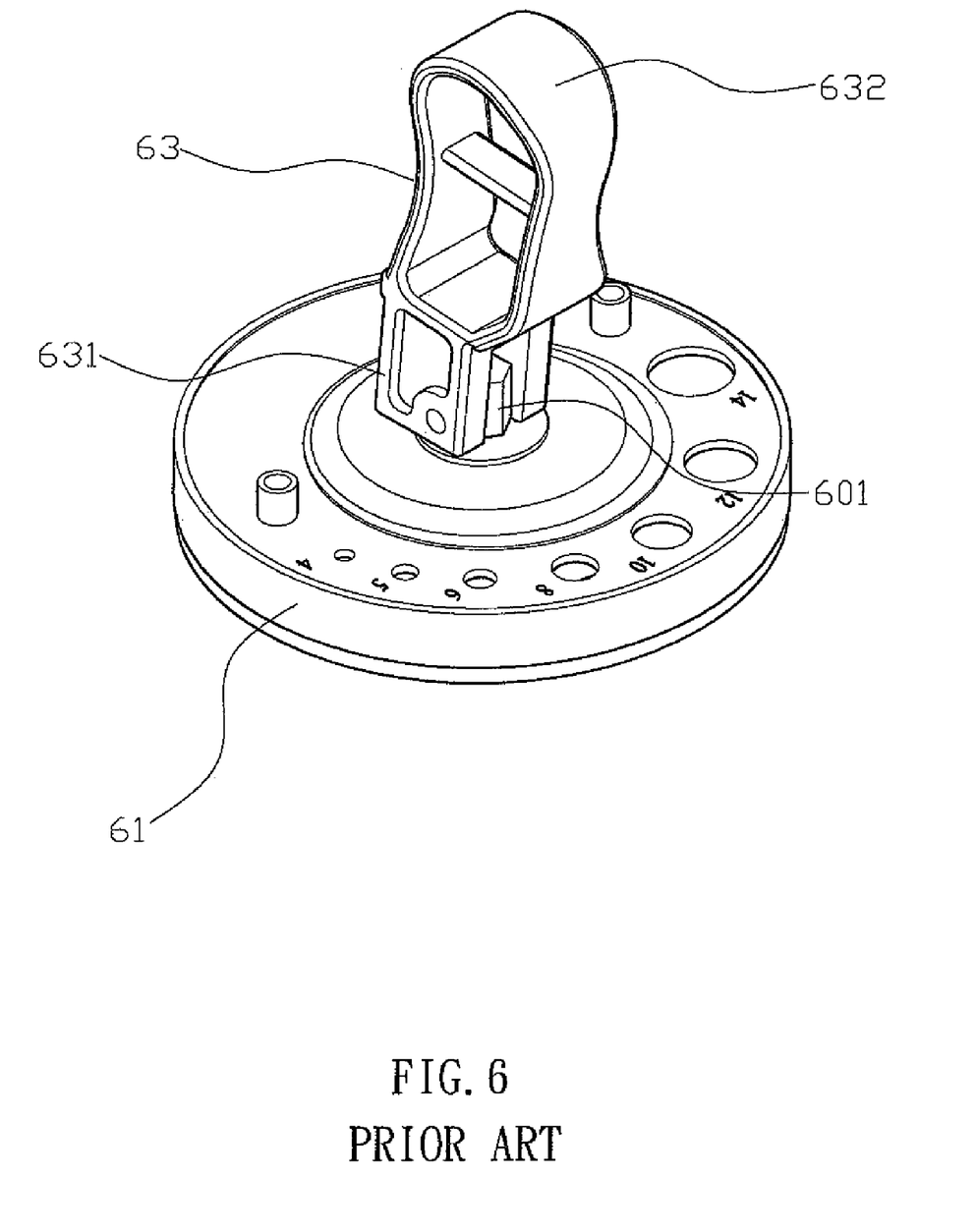
FIG. 6 is a perspective view of a conventional sucker in accordance with the prior art.
Figure 7:
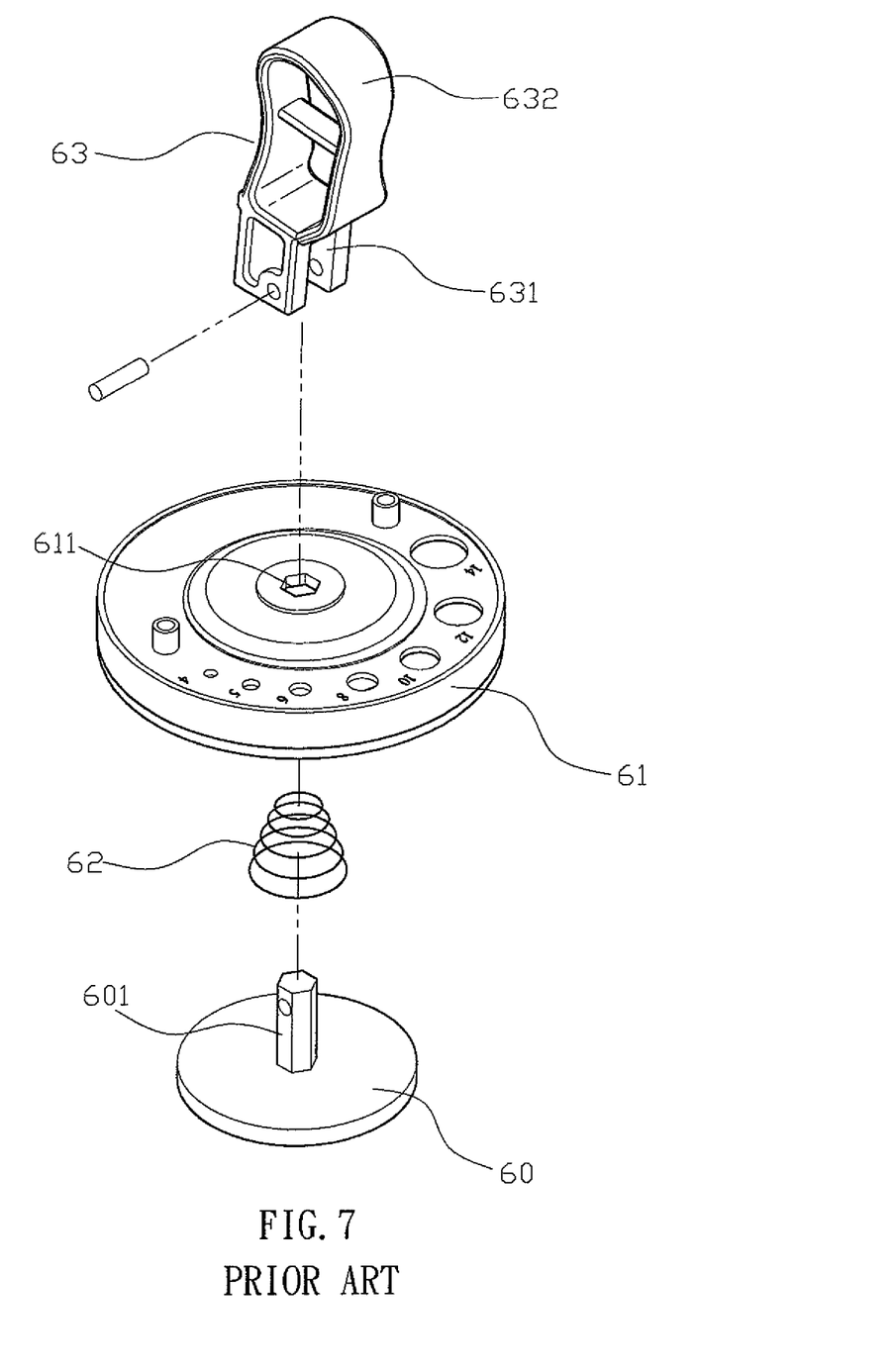
FIG. 7 is an exploded perspective view of the conventional sucker as shown in FIG. 6.
Figure 8:
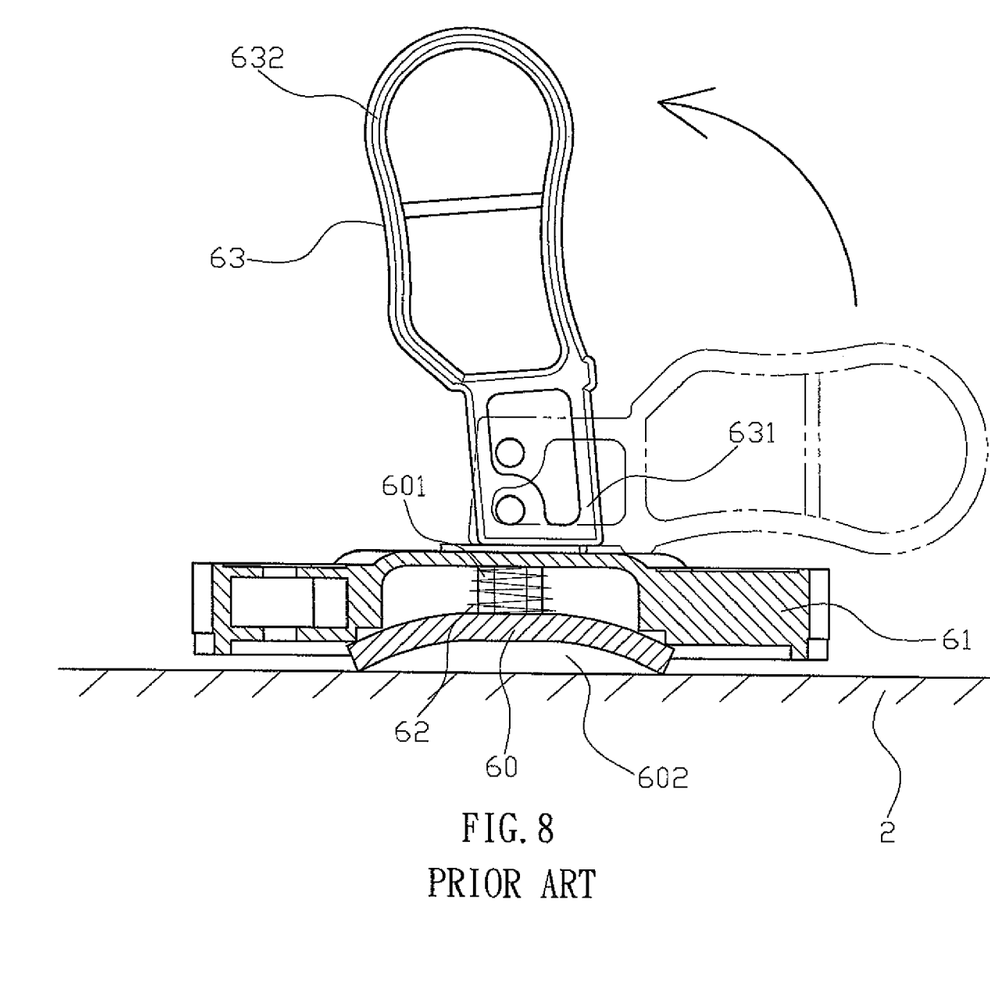
FIG. 8 is a schematic front cross-sectional operational view of the conventional sucker as shown in FIG. 6.

A conventional sucker in accordance with the prior art shown in FIGS. 6-8 comprises a fixing seat 61 having a central portion provided with a through hole 611, a sucker body 60 mounted on a first side of the fixing seat 61 and having a central portion provided with a driven post 601 extending through the through hole 611 of the fixing seat 61, a control handle 63 pivotally mounted on a second side of the fixing seat 61 and having a first end provided with an eccentric portion 631 pivotally mounted on the driven post 601 of the sucker body 60 and abutting the second side of the fixing seat 61 and a second end provided with a drive portion 632 to facilitate a user holding the control handle 63, and a compression spring 62 mounted on the driven post 601 of the sucker body 60 and biased between the sucker body 60 and the fixing seat 61.

In operation, the sucker body 60 initially rests on a surface 2, such as a wall. Then, the drive portion 632 of the control handle 63 is driven by a user to pivot the control handle 63 relative to the fixing seat 61. In such a manner, the eccentric portion 631 of the control handle 63 is pivotable relative to the fixing seat 61 in an eccentric manner to pull the driven post 601 of the sucker body 60 so as to compress the sucker body 60 toward the fixing seat 61, so that the second side of the sucker body 60 is curved to define a space 602 between the sucker body 60 and the surface 2 as shown in FIG. 8 to produce a vacuum suction force so as to attach the sucker body 60 onto the surface 2 closely.

However, the sucker body 60 is disposed at a vacuum state as shown in FIG. 8, so that even if the drive portion 632 of the control handle 63 is returned to the original state, the sucker body 60 is still bonded on the surface 2 closely and tightly and cannot be removed from the surface 2 easily and quickly, thereby causing inconvenience to the user when wishing to remove the sucker body 60 from the surface 2.

BRIEF SUMMARY OF THE INVENTION

In accordance with the present invention, there is provided a sucker, comprising a fixing seat, a sucker body mounted on a first side of the fixing seat and having a central portion provided with a driven post extending through the fixing seat, a control handle pivotally mounted on a second side of the fixing seat and having a first end provided with an eccentric portion pivotally mounted on the driven post of the sucker body and abutting the second side of the fixing seat and a second end provided with a drive portion, and a control valve mounted on the fixing seat and detachably abutting the sucker body to control a connection between the fixing seat and the sucker body. The sucker body has a first side provided with a recess facing the first side of the fixing seat and a second side provided with a connecting hole connected to the recess. The control valve includes a valve stem movably mounted on the fixing seat and movable to stop the recess of the sucker body so as to seal the connecting hole of the sucker body and to interrupt a connection between the connecting hole and the recess of the sucker body, and a restoring spring biased between the valve stem and the fixing seat to push the valve stem toward the recess of the sucker body.

The primary objective of the present invention is to provide a sucker that is removed easily and quickly.

Another objective of the present invention is to provide a sucker, wherein the pull knob of the valve stem can be pulled outwardly to detach the stop ball of the valve stem from the recess of the sucker body so as to connect the connecting hole and the recess of the sucker body and to connect the connecting hole of the sucker body to the ambient air so as to break the vacuum state of the sucker body so that the sucker body can be removed from a surface easily and quickly.

A further objective of the present invention is to provide a sucker, wherein the sucker body can be removed from the surface 1 without having to drive the control handle, thereby facilitating a user removing the sucker body from the surface.

Further benefits and advantages of the present invention will become apparent after a careful reading of the detailed description with appropriate reference to the accompanying drawings.

DETAILED DESCRIPTION OF THE INVENTION

Figure 1:
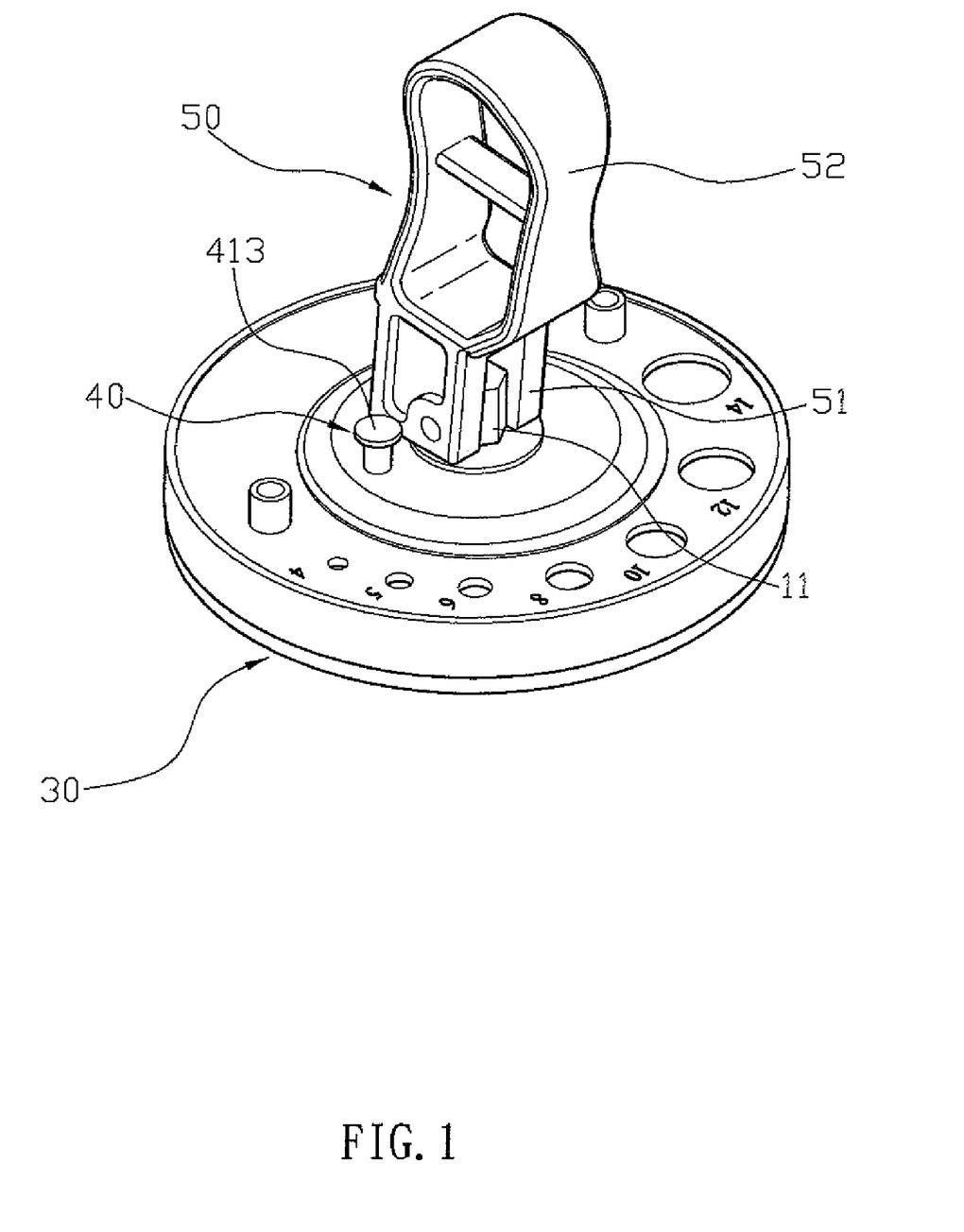
FIG. 1 is a perspective view of a sucker in accordance with the preferred embodiment of the present invention.
Figure 2:
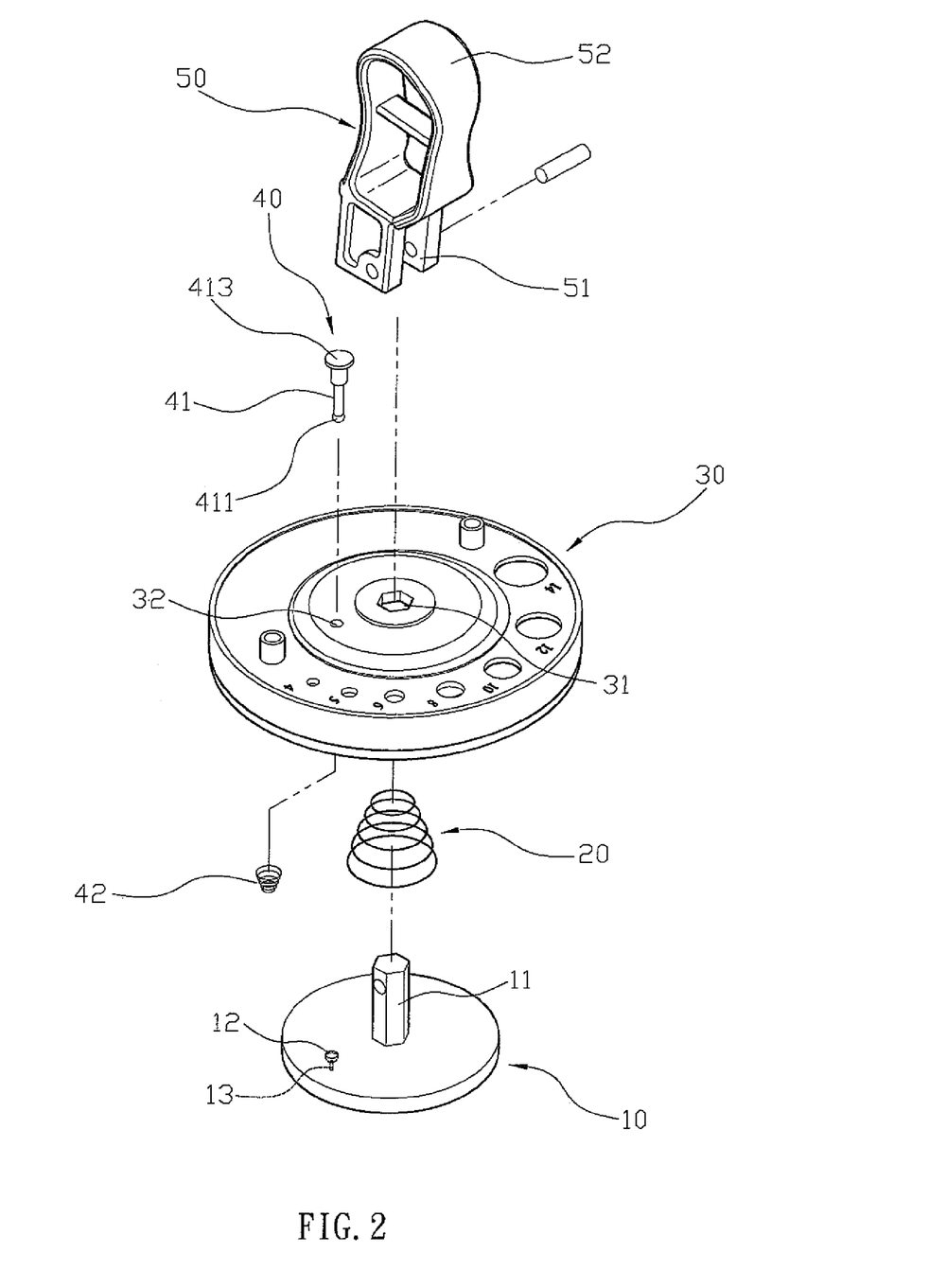
FIG. 2 is an exploded perspective view of the sucker as shown in FIG. 1.
Figure 3:
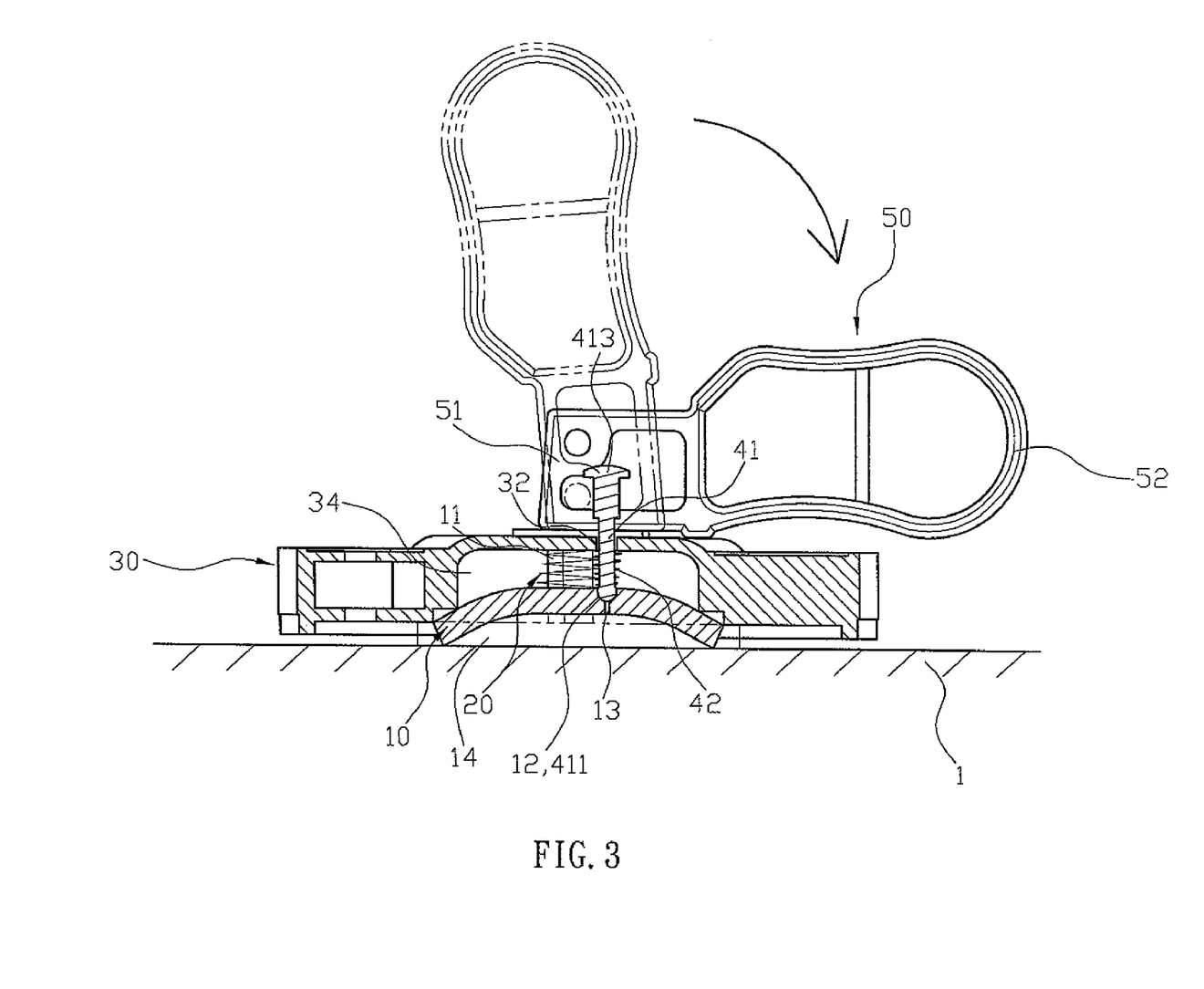
FIG. 3 is a schematic front cross-sectional operational view of the sucker as shown in FIG. 1.

Referring to the drawings and initially to FIGS. 1-3, a sucker in accordance with the preferred embodiment of the present invention comprises a fixing seat 30, a sucker body 10 mounted on a first side of the fixing seat 30 and having a central portion provided with a driven post 11 extending through the fixing seat 30, a control handle 50 pivotally mounted on a second side of the fixing seat 30 and having a first end provided with an eccentric portion 51 pivotally mounted on the driven post 11 of the sucker body 10 and abutting the second side of the fixing seat 30 and a second end provided with a drive portion 52 to facilitate a user holding the control handle 50, a compression spring 20 mounted on the driven post 11 of the sucker body 10 and biased between the sucker body 10 and the fixing seat 30, and a control valve 40 mounted on the fixing seat 30 and detachably abutting the sucker body 10 to control a connection between the fixing seat 30 and the sucker body 10.

The eccentric portion 51 of the control handle 50 is pivotable relative to the fixing seat 30 to pull the driven post 11 of the sucker body 10 so as to compress the sucker body 10 toward the fixing seat 30.

The sucker body 10 has a first side provided with a substantially semi-spherical recess 12 facing the first side of the fixing seat 30 and a second side provided with a connecting hole 13 connected to the recess 12. The connecting hole 13 of the sucker body 10 has a size smaller than that of the recess 12. The second side of the sucker body 10 is curved to define a space 14 connected to the connecting hole 13 when the sucker body 10 is pulled toward the fixing seat 30. The connecting hole 13 of the sucker body 10 is connected between the recess 12 and the space 14 of the sucker body 10.

The fixing seat 30 has a central portion provided with a through hole 31 to allow passage of the driven post 11 of the sucker body 19. The second side of the fixing seat 30 is provided with a positioning hole 32. The first side of the fixing seat 30 presses a periphery of the sucker body 10 and is provided with a receiving chamber 34 to allow entrance of the sucker body 10. The receiving chamber 34 of the fixing seat 30 is connected between the recess 12 of the sucker body 10 and the positioning hole 32 of the fixing seat 30, and the recess 12 of the sucker body 10 is connected between the receiving chamber 34 of the fixing seat 30 and the connecting hole 13 of the sucker body 10.

The control valve 40 includes a valve stem 41 movably mounted on the fixing seat 30 and movable to stop the recess 12 of the sucker body 10 so as to seal the connecting hole 13 of the sucker body 10 and to interrupt a connection between the connecting hole 13 and the recess 12 of the sucker body 10, and a restoring spring 42 biased between the valve stem 41 and the fixing seat 30 to push the valve stem 41 toward the recess 12 of the sucker body 10.

The valve stem 41 of the control valve 40 is movably mounted in the positioning hole 32 of the fixing seat 30 and has a first end provided with an enlarged stop ball 411 that is movable to stop the recess 12 of the sucker body 10 and a second end provided with a pull knob 413 protruding outwardly from the positioning hole 32 of the fixing seat 30. The pull knob 413 of the valve stem 41 has a substantially T-shaped cross-sectional profile and has a thickness greater than a diameter of the positioning hole 32 of the fixing seat 30 to prevent the pull knob 413 of the valve stem 41 from entering the positioning hole 32 of the fixing seat 30. The stop ball 411 of the valve stem 41 has diameter equal to that of the recess 12 of the sucker body 10.

The restoring spring 42 of the control valve 40 is mounted on the valve stem 41 and biased between the stop ball 411 of the valve stem 41 and the fixing seat 30 to push the stop ball 411 of the valve stem 41 toward the recess 12 of the sucker body 10.

Figure 4:
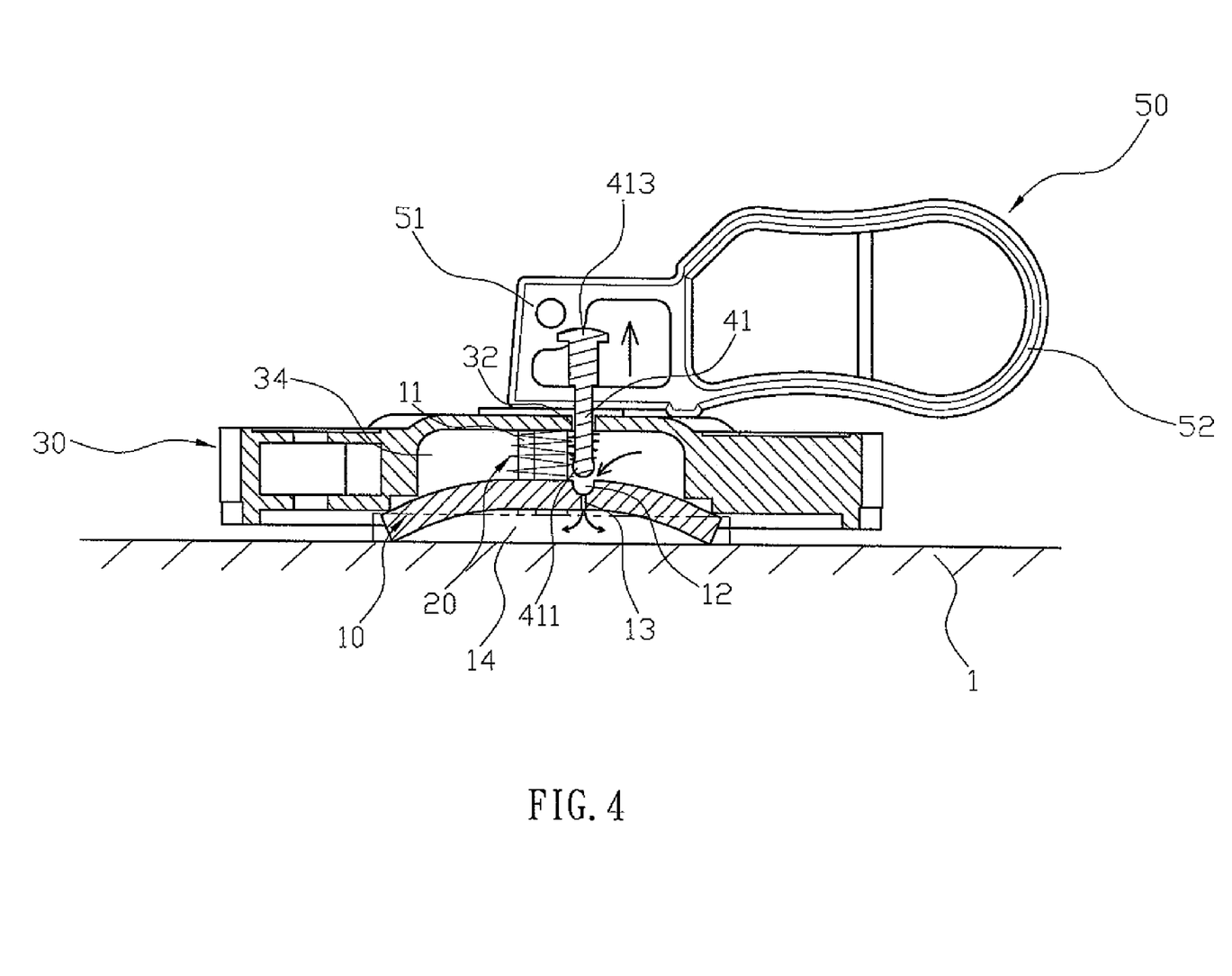
FIG. 4 is a schematic operational view of the sucker as shown in FIG. 3.

In operation, referring to FIGS. 3 and 4 with reference to FIGS. 1 and 2, the sucker body 10 initially rests on a surface 1, such as a wall. Then, the drive portion 52 of the control handle 50 is driven by a user to pivot the control handle 50 relative to the fixing seat 30. In such a manner, the eccentric portion 51 of the control handle 50 is pivotable relative to the fixing seat 30 in an eccentric manner to pull the driven post 11 of the sucker body 10 so as to compress the sucker body 10 toward the fixing seat 30, so that the second side of the sucker body 10 is curved to define a space 14 between the sucker body 10 and the surface 1 as shown in FIG. 3 to produce a vacuum suction force so as to attach the sucker body 10 onto the surface 1 closely.

At this time, the restoring spring 42 of the control valve 40 pushes the stop ball 411 of the valve stem 41 toward the recess 12 of the sucker body 10 to stop the recess 12 of the sucker body 10 so as to seal the connecting hole 13 of the sucker body 10 and to interrupt the connection between the connecting hole 13 and the recess 12 of the sucker body 10 to maintain the vacuum suction force in the space 14 of the sucker body 10.

When not in use, the valve stem 41 of the control valve 40 is movable outwardly relative to the sucker body 10 as shown in FIG. 4 by pulling the pull knob 413 of the valve stem 41 to detach the stop ball 411 of the valve stem 41 from the recess 12 of the sucker body 10 to connect the connecting hole 13 of the sucker body 10 to the recess 12 of the sucker body 10 so that the connecting hole 13 of the sucker body 10 is connected to the receiving chamber 34 and the positioning hole 32 of the fixing seat 30 via the recess 12 of the sucker body 10. Thus, the ambient air is introduced through the positioning hole 32 of the fixing seat 30, the receiving chamber 34 of the fixing seat 30, the recess 12 of the sucker body 10 and the connecting hole 13 of the sucker body 10 into the space 14 of the sucker body 10 to eliminate the vacuum suction force in the space 14 of the sucker body 10 so that the sucker body 10 can be removed from the surface 1 easily and quickly.

Figure 5:
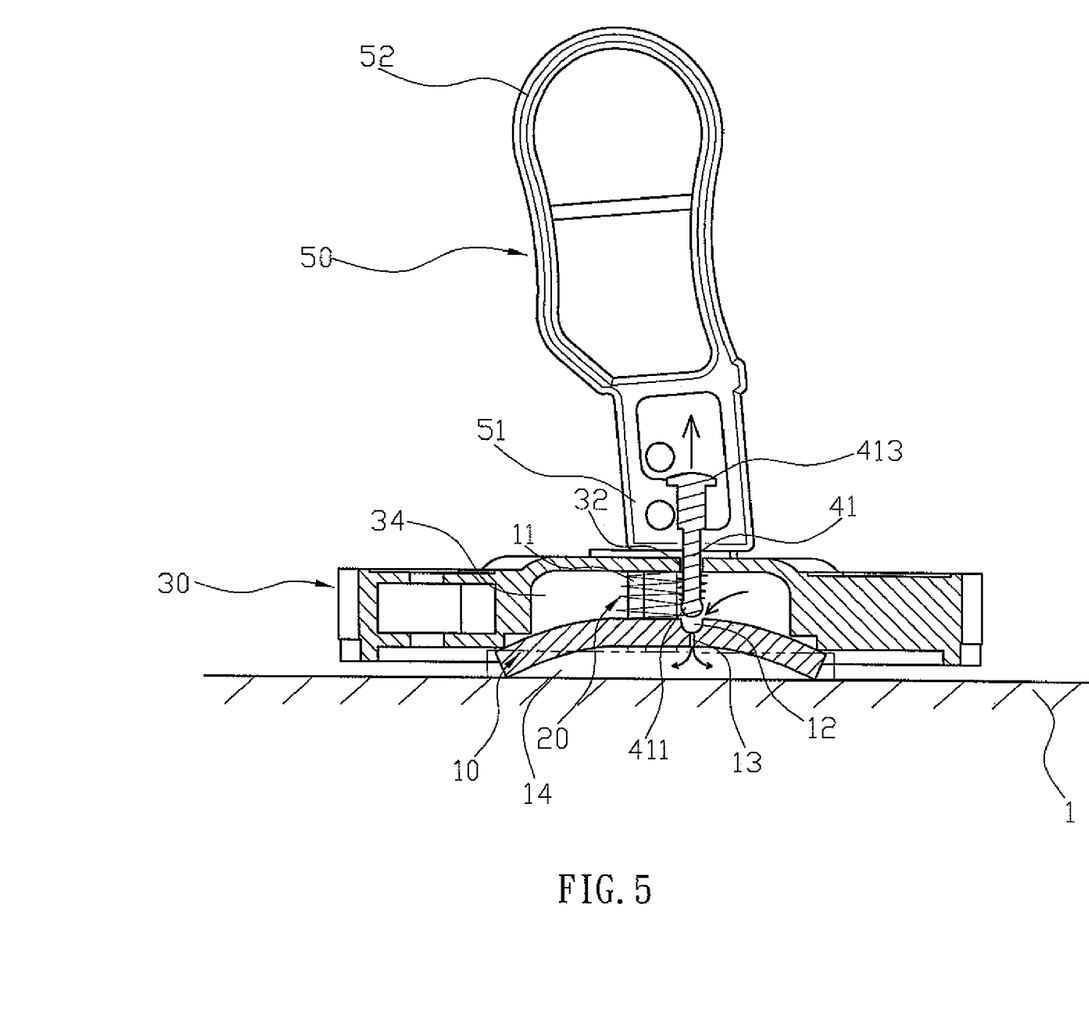
FIG. 5 is a schematic operational view of the sucker as shown in FIG. 3.

As shown in FIG. 5, when the sucker body 10 is still disposed at the vacuum state after the control handle 50 is returned to the original state, the pull knob 413 of the valve stem 41 can be pulled outwardly to break the vacuum state of the sucker body 10 so that the sucker body 10 can be removed from the surface 1 easily and quickly.

Accordingly, the pull knob 413 of the valve stem 41 can be pulled outwardly to detach the stop ball 411 of the valve stem 41 from the recess 12 of the sucker body 10 so as to connect the connecting hole 13 and the recess 12 of the sucker body 10 and to connect the connecting hole 13 of the sucker body 10 to the ambient air so as to break the vacuum state of the sucker body 10 so that the sucker body 10 can be removed from the surface 1 easily and quickly. In addition, the sucker body 10 can be removed from the surface 1 without having to drive the control handle 50, thereby facilitating a user removing the sucker body 10 from the surface 1.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A sucker, comprising:

a fixing seat;

a sucker body mounted on a first side of the fixing seat and having a central portion provided with a driven post extending through the fixing seat;

a control handle pivotally mounted on a second side of the fixing seat and having a first end provided with an eccentric portion pivotally mounted on the driven post of the sucker body and abutting the second side of the fixing seat and a second end provided with a drive portion;

a control valve mounted on the fixing seat and detachably abutting the sucker body to control a connection between the fixing seat and the sucker body;

wherein the sucker body has a first side provided with a recess facing the first side of the fixing seat and a second side provided with a connecting hole connected to the recess;

wherein the control valve includes:

a valve stem movably mounted on the fixing seat and movable to stop the recess of the sucker body so as to seal the connecting hole of the sucker body and to interrupt a connection between the connecting hole and the recess of the sucker body;

a restoring spring biased between the valve stem and the fixing seat to push the valve stem toward the recess of the sucker body.

2. The sucker in accordance with claim 1, wherein
the second side of the fixing seat is provided with a positioning hole;
the valve stem of the control valve is movably mounted in the positioning hole of the fixing seat and has a first end provided with an enlarged stop ball that is movable to stop the recess of the sucker body and a second end provided with a pull knob protruding outwardly from the positioning hole of the fixing seat.

3. The sucker in accordance with claim 2, wherein the pull knob of the valve stem has a thickness greater than a diameter of the positioning hole of the fixing seat to prevent the pull knob of the valve stem from entering the positioning hole of the fixing seat.

4. The sucker in accordance with claim 2, wherein
the recess of the sucker body has a substantially semispherical shape;
the stop ball of the valve stem has diameter equal to that of the recess of the sucker body.

5. The sucker in accordance with claim 1, wherein the connecting hole of the sucker body has a size smaller than that of the recess.

6. The sucker in accordance with claim 2, wherein the second side of the sucker body is curved to define a space connected to the connecting hole when the sucker body is pulled toward the fixing seat.

7. The sucker in accordance with claim 6, wherein
the first side of the fixing seat is provided with a receiving chamber to allow entrance of the sucker body;
the receiving chamber of the fixing seat is connected between the recess of the sucker body and the positioning hole of the fixing seat.

8. The sucker in accordance with claim 7, wherein the recess of the sucker body is connected between the receiving chamber of the fixing seat and the connecting hole of the sucker body.

9. The sucker in accordance with claim 8, wherein the connecting hole of the sucker body is connected between the recess and the space of the sucker body.

10. The sucker in accordance with claim 9, wherein the valve stem of the control valve is movable outwardly relative to the sucker body by pulling the pull knob of the valve stem to detach the stop ball of the valve stem from the recess of the sucker body to connect the connecting hole of the sucker body to the recess of the sucker body so that the connecting hole of the sucker body is connected to the receiving chamber and the positioning hole of the fixing seat via the recess of the sucker body.

11. The sucker in accordance with claim 2, wherein the pull knob of the valve stem has a substantially T-shaped cross-sectional profile.

12. The sucker in accordance with claim 2, wherein the restoring spring of the control valve is mounted on the valve stem and biased between the stop ball of the valve stem and the fixing seat to push the stop ball of the valve stem toward the recess of the sucker body.

13. The sucker in accordance with claim 6, wherein the eccentric portion of the control handle is pivotable relative to the fixing seat to pull the driven post of the sucker body so as to compress the sucker body toward the fixing seat.

14. The sucker in accordance with claim 1, wherein the first side of the fixing seat presses a periphery of the sucker body.

* * * * *